United States Patent
Raskin et al.

[11] Patent Number: 5,876,484
[45] Date of Patent: Mar. 2, 1999

[54] METHOD FOR REMOVING SOLUBLE METALS FROM AN AQUEOUS PHASE

[75] Inventors: Ilya Raskin, Manalapan; Slavik Dushenkov, East Brunswick, both of N.J.; Yoram Kapulnik, Ness Ziona, Israel; Nanda P. B. A. Kumar, New Brunswick, N.J.

[73] Assignee: Phytotech, Inc., Monmouth Junction, N.J.

[21] Appl. No.: 443,154

[22] Filed: May 17, 1995

[51] Int. Cl.⁶ ........................................................ C22B 3/18
[52] U.S. Cl. .................................. 75/711; 47/58; 210/602
[58] Field of Search .................. 75/711; 47/58; 210/602

[56] References Cited

U.S. PATENT DOCUMENTS

| | | |
|---|---|---|
| 3,728,254 | 4/1973 | Carothers . |
| 4,293,333 | 10/1981 | Drobot . |
| 4,293,334 | 10/1981 | Drobot et al. . |
| 4,310,990 | 1/1982 | Payne . |
| 4,333,837 | 6/1982 | Plosz et al. . |
| 4,678,582 | 7/1987 | LaVigne . |
| 4,732,681 | 3/1988 | Galun et al. . |
| 4,839,051 | 6/1989 | Higa . |
| 4,872,985 | 10/1989 | Dinges . |
| 4,904,386 | 2/1990 | Kickuth . |
| 4,959,084 | 9/1990 | Wolverton et al. . |
| 4,992,207 | 2/1991 | Darnall et al. . |
| 4,995,969 | 2/1991 | LaVigne . |
| 5,000,852 | 3/1991 | Tel-Or et al. . |
| 5,100,455 | 3/1992 | Pinckard et al. . |
| 5,106,504 | 4/1992 | Murray . |
| 5,120,441 | 6/1992 | Jackson et al. . |
| 5,121,708 | 6/1992 | Nuttle . |
| 5,156,741 | 10/1992 | Morrison et al. . |
| 5,269,094 | 12/1993 | Wolverton et al. . |
| 5,292,456 | 3/1994 | Francis et al. . |
| 5,320,663 | 6/1994 | Cunningham . |
| 5,337,516 | 8/1994 | Hondulas ................................ 210/602 |
| 5,393,426 | 2/1995 | Raskin et al. ........................... 210/602 |

FOREIGN PATENT DOCUMENTS

| | | |
|---|---|---|
| 3406004 | 8/1985 | Germany . |
| 277905 | 4/1990 | Germany . |
| 3921336 | 1/1991 | Germany . |
| 4100758 | 7/1992 | Germany . |
| 4319992 | 12/1994 | Germany . |
| 57-000190 | 1/1982 | Japan . |
| 61-161297 | 7/1986 | Japan . |
| 647997 | 1/1989 | Japan . |
| 1411295 | 7/1988 | U.S.S.R. . |
| WO 9401367 | 1/1994 | WIPO . |
| WO 9429226 | 12/1994 | WIPO . |

OTHER PUBLICATIONS

Heaton, Christine et al Technological & Environmental Chemistry 1986 vol. 11 pp. 125–135.

Checkai et al., "Effects of ionic and complexed metal concentrations on plant uptake of cadmium and micronutrient metals from solution", Plant and Soil, 99:335–345, 1987.

Conley et al., "An assessment of the root zone method of wastewater treatment", J. Water. Poll. Control. Fed. 63:239–247, 1991.

Crowley, "Mechanisms of iron acquisition from siderophoers by microorganisms and plants", Plant and Soil, 130:179–198, 1991.

(List continued on next page.)

*Primary Examiner*—Melvyn Andrews
*Attorney, Agent, or Firm*—Choate, Hall & Stewart

[57] ABSTRACT

A process for the removal of metal ions from solution and means for effecting such removal are described. The process is based on the hydroponic growth of sunflowers, terrestrial turfgrasses and/or members of the family Brassicaceae in solutions containing one or more metal ions. Metal ions can be efficiently removed from solutions by passing these solutions through the root biomass of these terrestrial plants. Receptacles containing the plants are also part of the invention.

28 Claims, 9 Drawing Sheets

OTHER PUBLICATIONS

Doushenkov, "Phytoremediation potential of corp plants", Supp. to Plant. Physiol., 105:43, 1994 (Abstracts of papers from Ann. Mtg. of Am. Soc. Plant Physiol., Portland, OR, Jul. 30–Aug. 3, 1994).

Doushenkov, "Rhizofiltration: the use of plants to remove heavy metals from aqueous streams", Environ. Sci. Technol., 29:1239, 1995.

Halvorson et al., "The critical $Zn^{2+}$ concentration for corn and nonabsorption of chelated zinc", Soil Soc. A.M. J., 41:531–534, 1977.

Heubert et al., "The effect of EDTA on cadmium and zinc uptake and toxicity in Lemna trisulco L", Arch. Environ. Contam. Toxicol., 22:313–318, 1992.

Jewell, "Resource–recovery wastewater treatment", Am. Scientist. 82:366, 1994.

M., "Dupont takes team approach to using plants for remediation", The Bioremediation report, p. 4, Jan. 1995.

Misra et al., "Heavy metal tolerant transgenic brassica napus and nicotiana tabacum L. plants", Theor. Appl. Genet., 78:161–168, 1989.

Raskin et al., "Bioconcentration of heavy metals by plants", Curr. Op. Biotech. 5:285–290, 1994.

Rauser, "Phytochelatins and related peptides", Plant Physiol., 109:1141–1149, 1995.

Raymer et al., Canola and Rapeseed, Chapter 3, "Agronomy of canola in the United States", pp. 25–35, 1990.

Reeves et al., "Abnormal accumulation of trace metals by plants", Mining Env. Management, pp. 4–7, Sep. 1995.

Salt et al., "Phytoremediation: a novel strategy for the removal of toxic metals from the environment using plants", Bio/Technology, 13:468, 1995.

Sunda et al., "Feedback interactions between zinc and phytoplankton in seawater", Limmol. Oceanog., 37:25–40, 1992.

Sunda et al., "The relationship between cupric ion activity and the toxicity of copper to phytoplankton", J. Marine Res., __:511–529, 1976.

Taiz et al., "Plant Physiology", Essential Elements, pp. 107–108, 1991.

Bender et al., "Lead removal from contaminated water by a mixed microbial ecosystem", 1989, Wat. Sci. Tech., vol. 21, Brighton, pp. 1661–1664.

Chigbo et al., "Uptake of arsenic, cadmium, lead and mercury from polluted waters by the water hyacinth eichornia crassipes", 1982, Environ. Pollution, (Series A), pp. 31–36.

Dierberg et al., "Removal of copper and lead using a thin–film technique", pp. 497–504, Aquatic Plants for Water Treatment and Resource Recovery (1987), Magnolia Publishing, Reddy and Smith (eds).

Haider et al., "Pollution Control . . . ", United Nations Environment Programme, 1984, pp. 627–634.

Kaiser Jamil et al., "Biotransfer of metals to the insect neochetina eichhornae via aquatic plants", Arch. Environ. Contam. Toxicol. 22, pp. 459–463, 1992.

S. Muramoto et al., "Removal of some heavy metals from polluted water by water hyacinth (Eichhornia Crassipes)", 1983, Bull. Environm. Contam. Toxicol., vol. 30, pp. 170–177.

Okieimen et al., "Removal of heavy ions from aqueous solutions with melon (citrullus vulgaris) seed husks", Biological Wastes, 0269–7483/89 1989. pp. 11–16.

Stratford H. Kay et al., "Effects of heavy metals on water hyacinths (eichhornia crassipes (Mart.) solms)", Aquatic Toxicology, 5, 117–128, 1984.

Terrence A. Lee et al., "Copper uptake by the water hyacinth", J. Environ. Sci. Health, A22(2), pp. 141–160(1987).

Truman D. Turnquist, "Nickel uptake by the water hyacinth", J. Environ. Sci. Health, A25(8), pp. 897–912 (1990).

B. C. Wolverton, "Aquatic plants for wastewater treatment: an overview", 1987, Aquatic Plants for Water Treatment and Resource Recovery, Magnolia Publishing, Inc. pp. 3–15.

5,876,484

METHOD FOR REMOVING SOLUBLE METALS FROM AN AQUEOUS PHASE

BACKGROUND OF THE INVENTION

Deposition of metal-rich mine tailings, metal smelting, leather tanning, electroplating, emissions from gas exhausts, energy and fuel production, downwash from powerlines, intensive agriculture and sludge dumping are the most important human activities which contaminate aqueous systems with water containing large amounts of toxic metals. The list of sites contaminated with toxic metals grows larger every year, presenting a serious health problem and a formidable danger to the environment. Water treatment procedures have been developed to remove metals from aqueous environments but they do a relatively poor job of removing toxic metals from residential and industrial aqueous waste, contributing to the overall problem.

Methods have been developed that utilize biologically active materials (e.g., higher plants) to remove toxic metals from wastewaters. Unfortunately, waste waters such as mine tailing drainage and water from smelting operations are nutrient poor and often contain concentrations of inorganic carbonaceous and nitrogenous nutrients that are insufficient to support growth of plants. Supplementation of metal-containing waste water with growth-promoting amounts of inorganic plant nutrients is problematic since the addition of external nutrients runs the risk of further pollution.

SUMMARY OF THE INVENTION

The present invention is a method for reducing an amount of metal in a metal-containing solution utilizing terrestrial plant roots to absorb, concentrate and precipitate metal from the aqueous solution. We have also discovered that we can maintain growth of plants in nutrient-free water by suspending the plant in nutrient-free water and by growing the plant in a receptacle that serves as a nutrient trap for externally added nutrients (i.e., nutrients added aerially to the plant or directly to the receptacle so that the plant roots do not first come into contact with the plant nutrients). We have also discovered that terrestrial plants will hydroponically take up heavy metal anions and cations and reduce the concentration of heavy metals down to sub- part per million levels. The methodology described herein is particularly advantageous for use in mine tailing drainage and water from smelting operations which are nutrient poor and cannot support growth of plants.

In one aspect, a method for reducing an amount of metal in a metal-containing solution includes contacting the solution with a root biomass of a terrestrial plant under conditions sufficient for the root biomass of the terrestrial plant to remove the metal from the solution. The terrestrial plant is then separated from the solution. In addition, the terrestrial plant may be processed for its metal content after separating the terrestrial plant from the solution. The step of contacting can also include contacting the solution with the root biomass by passing the solution through a column containing the root biomass. In other embodiments, the terrestrial plant is genetically altered and may be derived from a mutagenized progenitor.

Preferred methods include contacting the solution with the root biomass by growing the terrestrial plant in a receptacle disposed at an air/solution interface of the metal-containing solution and allowing the root biomass of the terrestrial plant to penetrate through the receptacle into the metal-containing solution. Most preferably, plant nutrients are incorporated into the receptacle from a source external to the metal-containing solution.

Another aspect of the invention is a method for reducing an amount of metal in a metal-containing solution that is free of plant nutrients. The method includes contacting a terrestrial plant or terrestrial plant seed with a receptacle disposed at an air/solution interface of the metal-containing solution. Plant nutrients are then added to the receptacle at a concentration and for a time sufficient to allow growth of root biomass through the receptacle and into the nutrient-free, metal-containing solution. The solution is placed in contact with the root biomass of the terrestrial plant under conditions sufficient for the root biomass of the terrestrial plant to remove the metal from the solution. The terrestrial plant is separated from the solution. Preferred terrestrial plants useful in the method include terrestrial plants selected from the group consisting of sunflower, turfgrasses and members of the Family Brassicaceae.

Another aspect of the invention is a method for reducing an amount of metal in a metal-containing solution, including selecting a terrestrial plant that is capable of depleting, by at least a factor of two, an initial amount of metal from the metal-containing solution. Root biomass of the plant is contacted with the metal-containing solution under conditions sufficient for the root biomass of the terrestrial plant to deplete the initial amount of metal from the solution. The root biomass of the terrestrial plant is then replaced with root biomass of another terrestrial plant and the other plant's root biomass contacts the metal-containing solution under conditions sufficient for the root biomass of the other terrestrial plant to continue to remove metal from the solution. The root biomass of the other terrestrial plant is then removed from the solution.

A further aspect of the invention is a method of hydroponically growing terrestrial plants in nutrient-free solution. The method includes providing a receptacle disposed at an air/solution interface of the nutrient-free solution. The receptacle includes a feeder layer for receiving inorganic plant nutrients. Next, inorganic plant nutrients are incorporated into the feeder layer from a position external to the nutrient-free solution. The plant nutrients are incorporated in an amount sufficient for the terrestrial plant to grow roots that extend into the nutrient-free solution.

Figure 9:
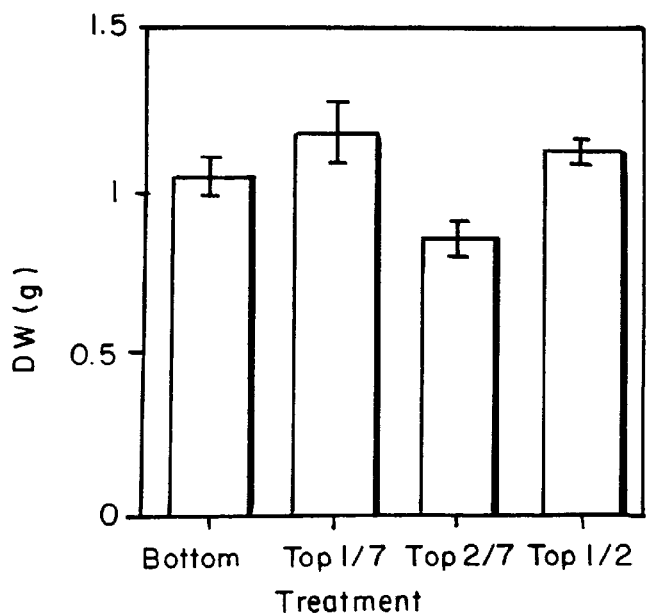

FIG. 9 is a graph of root biomass (dry weight) plotted against type of feeder layer treatment. The nutrient additions were : (1) 120 mL liquid (without plant nutrients) in the feeder layer once a week; nutrients supplied from the hydroponic solution ("Bottom"); (2) 60 mL in the feeder layer once a week ("Top 1/7"); 60 mL in the feeder layer twice a week ("Top 2/7"); 60 mL in the feeder layer every other day ("Top 1/2").

Figure 10:
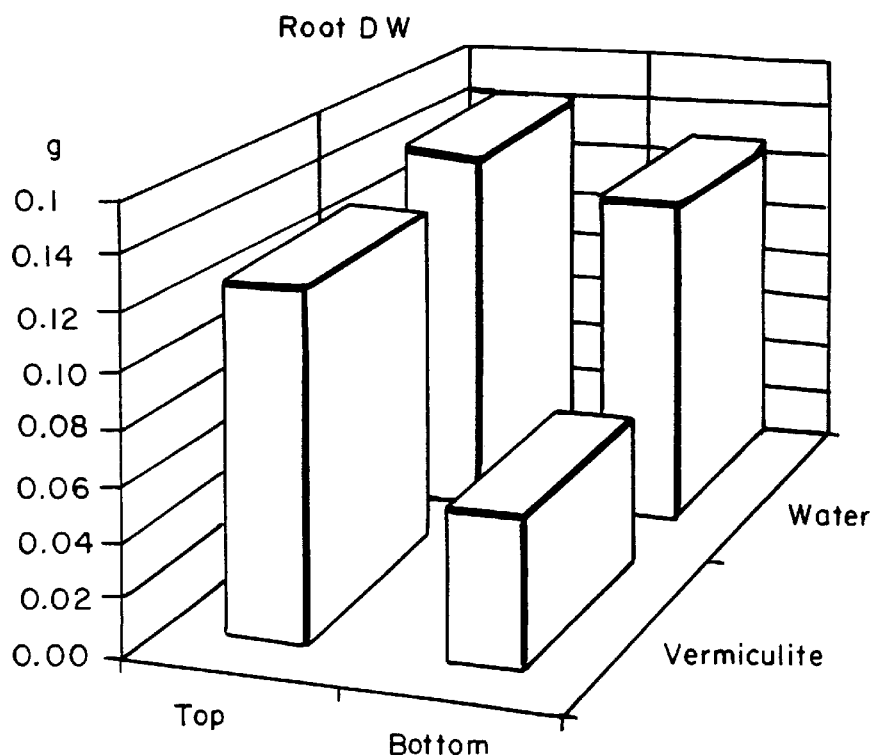

FIG. 10 is a graph of root biomass (dry weight) plotted against feeder layer treatment using standard nutrient solution every other day. ("Top"). Root biomass of plants supplied with 60 mL of tap water in the feeder layer are labeled as "Bottom").

Figure 11:
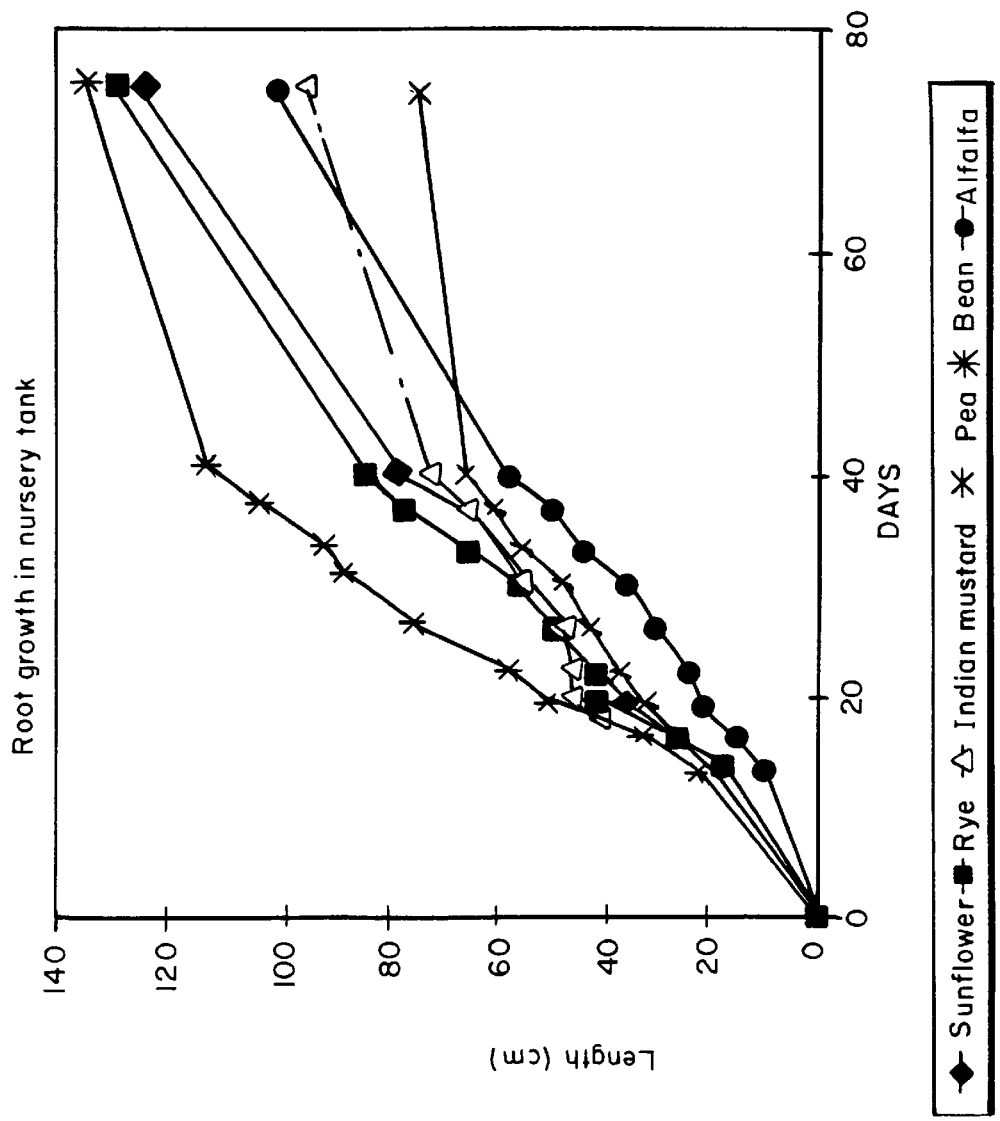

FIG. 11 is a graph illustrating temporal changes in root length of various plants grown in nutrient-free water using a receptacle of the present invention.

Figure 12:
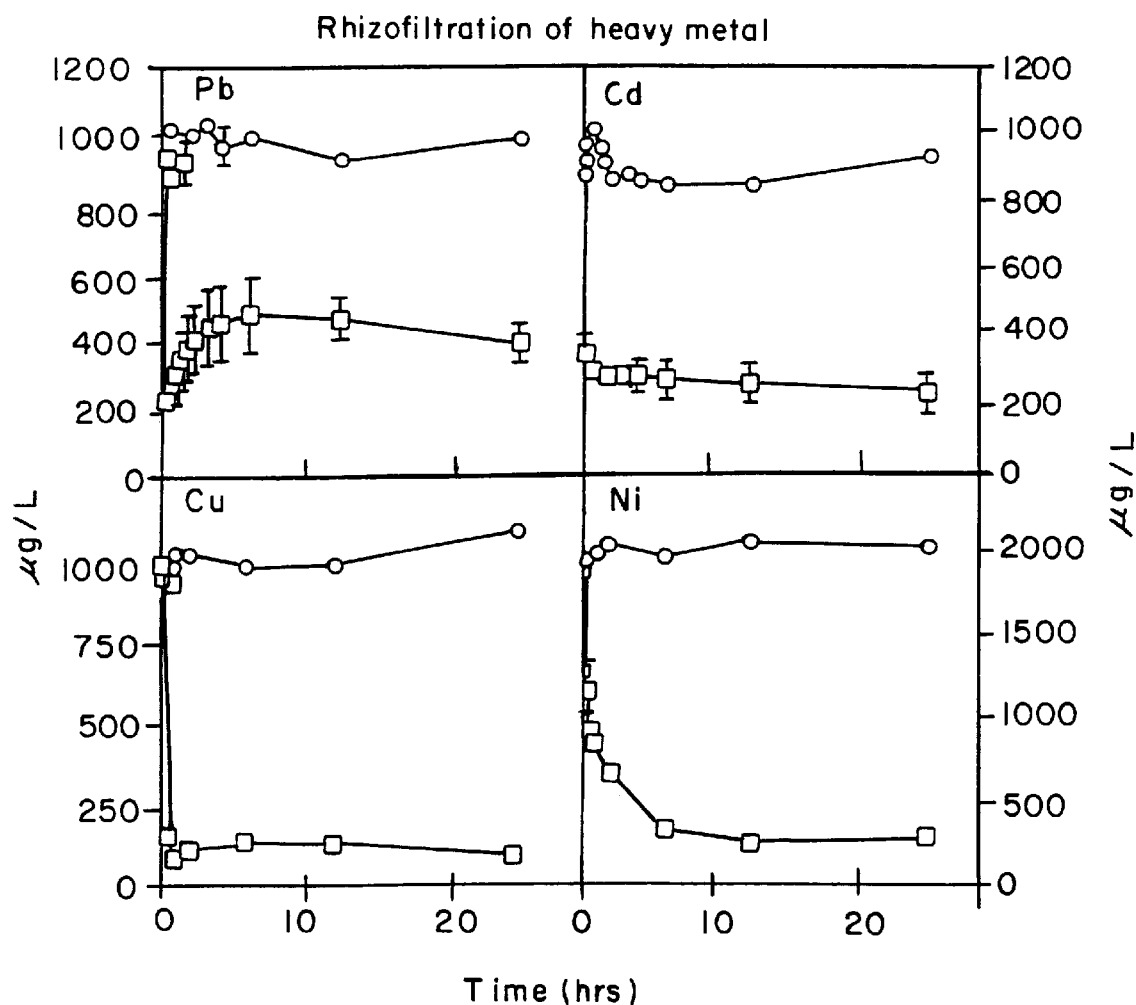

FIG. 12 is a graph of heavy metal concentration in hydroponic solution as a function of time for Cd, Pb, Cu and Ni, illustrating the initial rapid uptake phase by plants.

Figure 13:
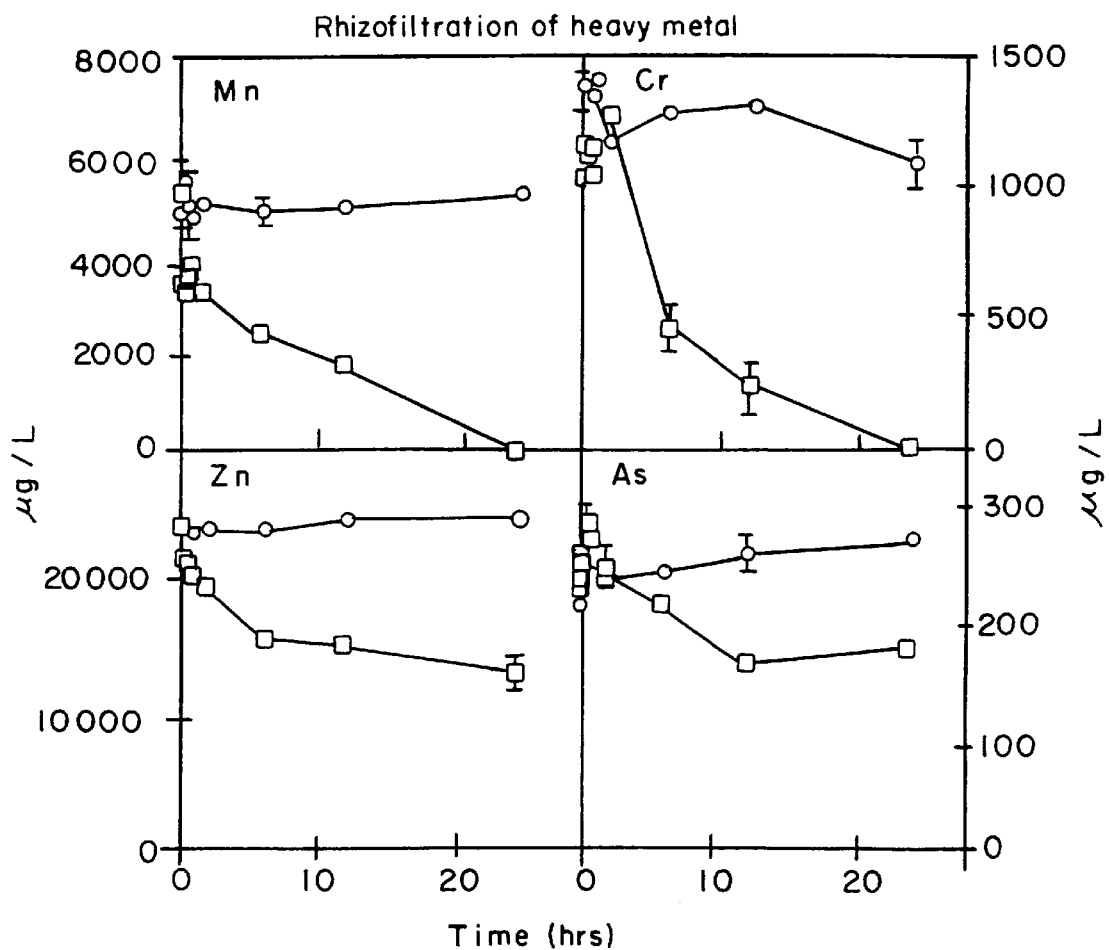

FIG. 13 is a graph of heavy metal concentration in hydroponic solution as a function of time for Mn, Cr, Zn and As.

Figure 14:
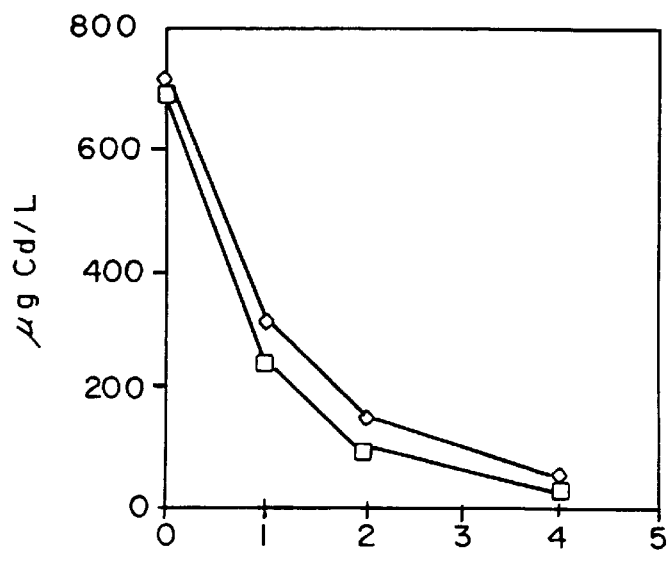

FIG. 14 is a graph of heavy metal concentration in solution as a function of time for Cd, illustrating rapid, substantially complete (700-fold) depletion of Cd in solution.

DETAILED DESCRIPTION OF THE INVENTION

This invention is based in part, on exploitation of the ability of certain plants to concentrate metals from solution. This concentration can occur by one, or both of the following mechanisms:

(a) Soluble metals can be accumulated by the plant and transferred into plant biomass, in particular, the root and/or shoot biomass. Preferred methods of the present invention utilize plants that will preferably accumulate metals in the root biomass.

(b) Certain plants can precipitate soluble metal out of a metal-containing solution. This phenomenon is documented for the first time as part of this invention and is believed caused by sorption of metal ions to root cells and by the precipitation or chelation of metals on the root surface with inorganic and organic root exudates. That is, in a chemical engineering sense, roots can act as both ion exchange resins and as chemical precipitators.

The present method for reducing an amount of metal in a metal-containing solution is used to remove primarily metal ions from the solution by either allowing for uptake of the metal ions into the plant biomass or by conversion of the soluble metal ions into an insoluble form. The term "soluble metal ions" means metal cations or metal-containing anionic species. Soluble metal ions may be present, either alone or bound with anions or chelating agents, that are soluble in the solution at environmentally relevant temperatures (e.g. greater than 0 degrees C. to less than about 45 degrees C.). The term "insoluble" refers to metal ions that are substantially insoluble in the solution at environmentally relevant temperatures. The term "insoluble" is also intended to include non-ionic, elemental forms of the metal.

The method is used for the removal of metals that are selected from the commonly known heavy metals, radionuclides, and transition elements such as, for example, lead, chromium, iron, magnesium, aluminum, mercury, cadmium, cobalt, nickel, molybdenum, copper, arsenic, selenium, zinc, antimony, beryllium, gold, barium, manganese, silver, osmium, thallium, tin, rubidium, strontium, vanadium, yttrium, technecium, ruthenium, palladium, indium, lanthanum, thorium, tungsten, rhenium, bismuth, germanium, radium, cesium, uranium, plutonium, and cerium. The term "metal" is also meant to include mixtures of metals and common organic pollutants, for example, lead or chromium in combination with nitrophenol, benzene and/or alkylbenzyl sulfonates (detergents). The method may also be capable of removing more than one metal from an aqueous solution. Literature reports suggest that certain plants may concentrate several different metals in their roots, implying that the mechanism of metal uptake is not always metal-specific.

The term "solution" refers to any metal-contaminated liquid such as industrial and residential waste streams, water treatment-plant effluents, ground and surface water, diluted sludge and other aqueous streams containing radioactive and non-radioactive metals.

The plants used in the preferred methods are terrestrial plants. The term "terrestrial" refers to photosynthetic plants that normally grow in soils or sediments. The soils or sediments can include a variety of soil types having wide ranges of water content and organic matter content. The terrestrial plants can therefore include crop-related plants and/or plants associated with environments such as wetlands. The term is also meant to include portions of terrestrial plants (i.e. excised shoots and/or roots). The term "terrestrial" is not, however, meant to refer to strictly aquatic plants that spend their entire life cycle completely floating on, or submerged in, an aqueous solution. These aquatic plants also include floating ferns, (e.g., Azolla), duckweed (Lemna , and water hyacinth (Eichhornia). Moreover, the term "terrestrial" is not intended to include isolated plant cells or cell suspensions capable of metal uptake.

The hydroponically-grown terrestrial plants selected for use in the present method can accumulate metals in their roots and translocate the metal to the shoots (i.e., those portions above the aqueous solution). Roots of a whole terrestrial are contacted with the metal containing solution under conditions sufficient for the roots to remove metal from the solution and accumulate the metal. After accumulation, the whole plant is removed from the solution and processed, as described below. Another terrestrial plant capable of accumulating metal is then contacted with the metal-containing solution and the process is repeated. The term "hydroponic" has a well-recognized meaning to those of ordinary skill in the art and generally refers to the science of growing plants in solutions containing necessary growth promoting materials, instead of in soil.

The present invention, apparatus, and process are intended to take terrestrial plants that have no natural capacity to float in water but are rooted to the soils and to create for them a supported at, or above, the solution/air interface. This is accomplished by constructing an enclosed receptacle containing a feeder layer. The feeder layer, in addition to a terrestrial plant, may contain rich earth, sand, humus, clay, synthetic materials such as rockwool and Vermiculite or Perlite and, among other options, activated carbon, charcoal, sand, burned and unburnt wood. These materials act as traps for inorganic plant nutrients (e.g., carbonaceous nutrients such as carbonates, nitrogenous nutrients such as nitrate ion, nitrite ion, ammonium ion, ammonia gas, phosphorous containing nutrients such as inorganic phosphate). Essentially, the receptacle and its feeder layer serves as a life support system for the terrestrial plant into which are added external nutrients. In this regard, the term "external" means inorganic nutrients, and possibly other plant growth-promoting materials, that are not supplied to the plant by way of the hydroponic solution. Most preferably, the nutrients are added either aerially to the growing shoots and/or leaves or are added directly in liquid form to the feeder layer of the receptacle. In either situation, the nutrients first come into contact with the plant by way of the shoots or leaves, but not the roots. Using this approach, we have been able to grow roots of terrestrial plants in nutrient-free water by suspending the plant via the receptacle in nutrient-free water and by using the feeder layer as a nutrient trap for externally added nutrients (i.e., added aerially or added directly to feeder layer). The term "nutrient-free" is necessarily an operational definition and refers to solutions containing plant growth-promoting nutrients in concentrations that are below those needed to support plant growth, whether or not the concentrations are detectable. Persons having ordinary skill in the art may readily be able to test terrestrial plants used in the present invention for that limiting concentration of plant nutrient, below which growth of the particular plant is affected.

The receptacle is preferably a rigid frame which may be made of plastic, wood, or metal, or combinations of the above materials. The exact nature of this frame is not significant to this invention, only that it be sufficiently rigid so that the terrestrial plant roots and rhizomes may grow through the frame into the metal-containing water without loss of the feeder layer material, as described above. The frame may be supported above the solution/air interface (See FIG. 1) or may float on the surface of the solution.

Many terrestrial plants used in the present method do not contain significant amounts of metal in their shoots. Shoots that do contain large amounts of metal may be discarded with no special precautions or may be allowed to regenerate new roots. Perennial grasses offer specific advantages in this regard. Their roots can be continuously harvested and new roots will grow from the remaining shoots. Once the new roots are grown, the hydroponic metal uptake methods are repeated. The most preferred terrestrial plants are therefore those having roots that absorb and/or precipitate metals, and can be harvested in bulk in the shortest practical period of time.

Concentrating the metal from plants after harvesting may be accomplished either by direct smelting of the bulk plant matter or may incorporate a number of volume reduction steps before the smelting process. Methods of reducing the bulk volume of the plant matter include incineration, anaerobic and aerobic digestion, acid digestion or composing. The most preferred method of concentration is a method that involves one or more of the above mentioned volume reduction methods followed by direct smelting. Smelting of metal (e.g. lead)- containing material is a technique well known in the art and variations on the method are given in, for instance, "Lead Smelting and Refining: Its Current Status and Future" by M. Kazue, pp. 23–38T, in Lead-Zinc 1990, Proc. World Symp. Metall. Environ. Control, T. S. Mackey (ed.); Mineral., Metal. Mater. Soc., Warrendale, Pa. (1990), herein incorporated by reference.

Thus, post-harvest processing of the terrestrial plant material includes one or more steps that will result in the environmentally acceptable reclamation or disposal of the metal in the plant tissue. In the event that a pre-processing step is needed to increase metal concentration and bulk density, as well as to reduce the total volume, concentration of the terrestrial plant biomass may be accomplished by processes including aerobic digestion (e.g. a compost pile), anaerobic digestion (e.g., enclosed tank), incineration (e.g. ashing), grinding, chopping, palliating, or wet chemical digestion (acid treatment).

The terrestrial plants most suitable for the present invention are a variety of turfgrasses and members of the family Brassicaceae as well as the common sunflower, Helianthus *annuus* L and rye (*Secale cereale* L.). Exemplary turf grasses include Colonial bentgrass, Kentucky bluegrass, perennial ryegrass, creeping bentgrass, a variety of fescues and lovegrasses, Bermudagrass, Buffalograss, centipedegrass, switch grass, Japanese lawngrass and coastal panicgrass. Members of the Brassicaceae include *Brassica juncea* and *B. oleracea*. Other plants also suitable for the present method include spinach, sorghum, tobacco, and corn. See Table 1.

A preferred procedure is to grow selected plants from seeds (i.e. Brassica or Helianthus) or grass sod (e.g. turfgrasses) in a hydroponic environment with roots immersed in a nutrient solution. After a period of time, the nutrient solution is replaced with a metal-ion containing solution. There are many instrumental techniques available for analysis of toxic heavy metals. Among the most commonly employed methods are flame and furnace atomic absorption spectrophotometry (AAS), anode stripping voltametry, and polarographic techniques. Preferred is the method of inductively coupled atomic plasma spectroscopy (ICP) and the instruments most preferred are those similar to the SPECTROFLAME ICP (Spectro Analytical Instruments Inc., Fitchburg, Mass.). In order to accurately determine concentrations of metal by any spectroscopic method, the method must incorporate some standard of similar organic composition and containing a known amount of metal to be detected. For example, suitable lead standards may be used such as the Pine Needle Standards and Buffalo River Sediment Standards containing known amounts of lead obtained from the National Institute of Science and Technology (NIST). Plant tissue and standards are subjected to acid digestion and analysis by ICP along with samples suspected of containing lead according to established protocols. See Blincoe et al., *Comm. Soil. Plant Anal.*, 18: 687 (1987); Baker and Suhr, "Atomic Absorption Spectrometry", pp. 13–27 in *Methods of Soil Analysis*, part 2, Am. Soc. Agron., Madison, Wisc., (1982). Metal remaining in the solution is measured by, for example, atomic absorption or plasma spectrometry. See, Soltanpour et al., "Optical emission spectrometry", pp. 29–65 in *Methods of Soil Analysis*, part 2, Am. Soc. Agron., Madison, Wisc., (1982).

The difference between the decrease in metal in solution and metal concentration in the plant is the amount of metal precipitated out of the solution (see Example 1). Plants exhibiting the best metal uptake and/or precipitation properties may be further tested by obtaining seeds from various germ plasm collecting centers and laboratories. The cultures grown from these seeds are re-tested with the screening assay described above. It will be appreciated that this screening assay can be performed on plants other than those members described herein and using metals other than those specified herein.

The terrestrial plants may also include those plants that are selectively bred and/or genetically engineered for an enhanced ability to accumulate metals in a hydroponic environment. Alternatively, or in addition, the plants may therefore be genetically manipulated. For example, the plants may be genetically manipulated by mutagenesis using well-known chemical mutagens. For example, ethylmethylsulfonate (EMS) is a potent mutagen which increases genetic variability by increasing the frequency of genomic mutations. See, for example, Redei, G. P. "Genetic Manipulations of Higher Plants", L. Ledoux (ed), Plenum Press, New York, (1975), incorporated herein by reference. Ethylmethylsulfonate has been used in selection programs to produce heritable changes in plant biochemistry and physiology, particularly in *Arabidopsis thaliana*, a member of the Brassicaceae. The hydroponic screening system described above is used to identify terrestrial plant species with the highest metal accumulating and precipitating potential. The seeds of these lines are then subjected to EMS mutagenesis using, for example, the methods of Estell et al, "The mutants of Arabidopsis", p. 89 in *Trends in Genetics*, Elsevier Science Publishers, B. V., Amsterdam, 1986.

Briefly, genetic manipulation by way of mutagenesis is accomplished by soaking seeds in EMS solution to induce heterozygous mutations in those cells which will produce the reproductive structures. The M1 generation of plants is allowed to self-fertilize and at least 50,000 seedlings of the M2 progeny are screened for metal tolerance in artificial aqueous solutions containing various metal concentrations. The most tolerant M2 plants, those growing most vigorously, are analyzed for accumulation of metals; see Example 2.

Furthermore, the terrestrial plants used in the hydroponic methods of the present invention can also be genetically manipulated using well-established techniques for plant gene transfer. See Redei, supra. As one example of the genetic manipulations available, it is well-known that a variety of non-photosynthetic organisms respond to metals by production of metallothioneins (MT's), low molecular weight proteins encoded by structural genes. See, for example Maroni, G., "Animal Metallothioneins", pp. 215–232 in *Heavy Metal Tolerance in Plants; Evolutionary Aspects*, (ed. A. J. Shaw), CRC Press Inc., Florida (1990). The present invention contemplates increasing root uptake of metals by heterologous expression of MT's in transgenic plants, the term "heterologous" meaning a gene from a different organism as the transformed plant. A mammalian MT cDNA (e.g. monkey) can be obtained commercially or from an established source and a restriction enzyme fragment cloned into, for example, an Agrobacterium-based plant transformation/expression vector such as pJB90, a derivative of pGSFR780A. See, DeBlock et al., *Physiol Plant.*, 91: 694–701 (1989).

Seedling segments of terrestrial plants used in the present method are then incubated in the presence of a suspension of bacterial cells (e.g. *Agrobacterium tumefaciens*) carrying the expression vector. After several days, the regenerating seedling segments are transferred to the appropriate selection medium and further incubated. This results in transformants containing the mammalian MT gene (see Example 6).

The transformants are analyzed for the presence of MT DNA by Southern and Northern hybridization using mammalian MT as the probe. The transformants are also analyzed for expression of MT protein by immunoblot analysis with antisera against mammalian MT. See established protocols of, for example, Sambrook et al., Molecular Cloning: A Laboratory Manual, Cold Spring Harbor Laboratory Press, New York (1989). It will be readily understood that transformants may be developed that express a homologous gene, i.e., a gene from the same organism as the transformed plant. The homologous gene may be differentially expressed as compared to the same gene in a non-transformed plant.

A method for reducing the amount of metal in a metal-containing solution includes contacting the aqueous solution with a root biomass of a terrestrial plant under conditions sufficient for the root biomass to convert the metal from a soluble form to an insoluble form. As discussed above, metal-ion removal can be easily determined by measuring the concentration of metal in the solution and in the plant biomass using a variety of well-known and well-characterized metal detection assays.

The methods of the invention rely on growth of terrestrial plants in a hydroponic system so that the root biomass will have maximum contact with the solution. The exact method of growing the plants hydroponically is not intended to limit the scope of the invention. For example, the methods can include several hydroponic systems currently available. One system is a hydroponic method in which plants are grown in a receptacle for holding aerated solutions in which the plant roots are in contact with the solution containing the metals. The metal containing solution is periodically moved through the inert support that anchors the plants. Another hydroponic method involves growing plants in a column through which solution moves at regular intervals so that the roots never have a chance to dry out. This technique of moving the metal-containing solution over the roots will be referred to as a "flow-through" system. A further method involves incubating the roots in the metal-containing solution, which is continuously drained and refilled. This method provides for good root aeration and will be referred to hereinafter as an "intermittent" flow method. Another method is the so-called "aeroponic" method which involves contacting the developing roots with the metal-containing solution using ultrasound or compressed air to provide an aqueous mist or aerosol as the solution. Production of a mist or aerosol using ultrasound or compressed air are both well-known procedures exemplified by U.S. Pat. No. 5,017,351 (Rafson).

The preferred method includes contacting a metal-containing aqueous solution with the root biomass of a terrestrial plant by moving the solution through a column containing the root biomass. The column is preferably rendered opaque so that the roots are in darkness. The column can, however, be in a variety of configurations, not intended to limit the scope of the invention. For example, the column can be substantially horizontal so that the depth of the solution in the column is substantially less than the length of the column. This typically includes construction of elongated troughs which contain the root biomass. Alternately, the column can be oriented in a vertical position in which the depth of the solution is equal to or greater than the column width. In this configuration, the solution can flow vertically within the column. So long as the aqueous solution is in contact with the root biomass for a time sufficient for the roots to convert the metal from a soluble form into an insoluble form, the exact configuration of the column is of little significance. After uptake and/or precipitation is completed, the roots are then separated from the solution.

Figure 1:
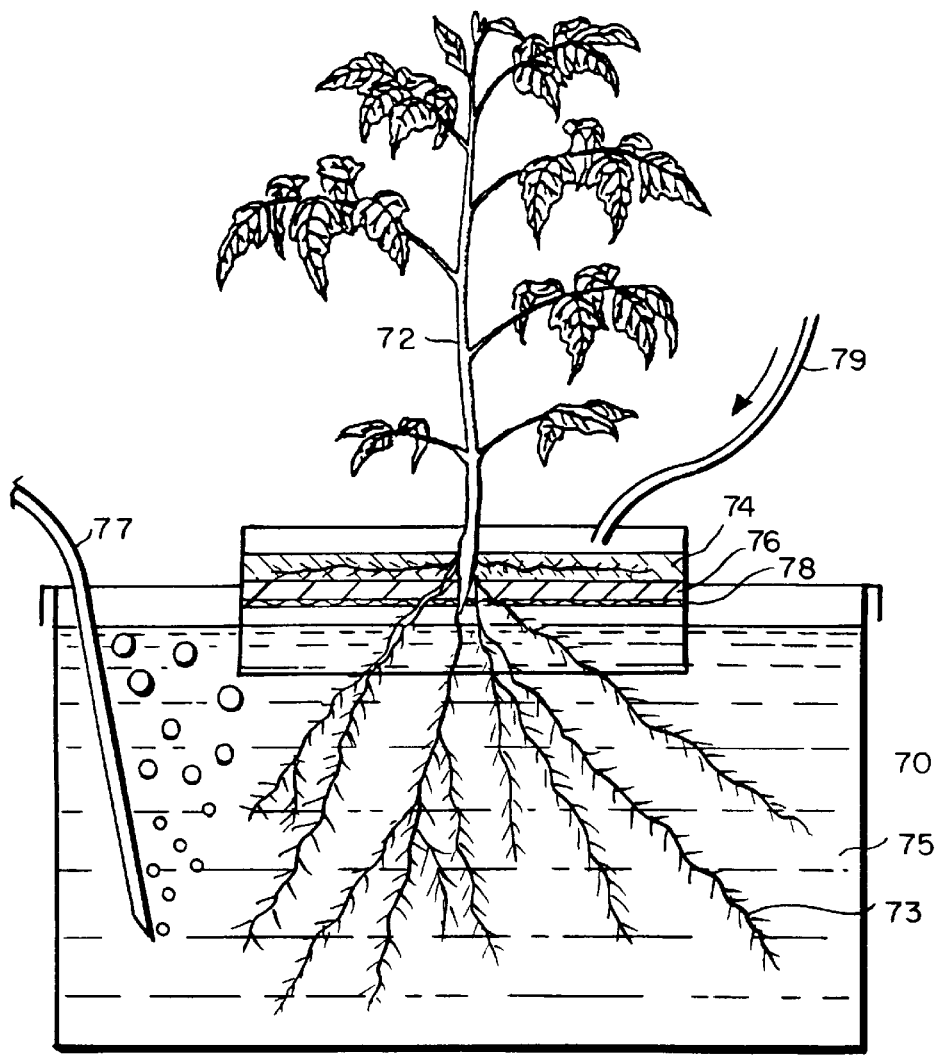
FIG. 1 illustrates a schematic, cross-sectional view of a preferred receptacle and feeder layer assembly.

A preferred receptacle and feeder layer assembly is illustrated in FIG. 1. The receptacle 70 holds a feeder layer 74 that contains at least one terrestrial plant 72. The feeder layer itself 74 is underlain by porous layer 76. Layer 76 is sufficiently porous so that roots 73 of terrestrial plant 72 may penetrate both the feeder layer 74 and layer 76 and grow into the metal-containing solution 75. In the embodiment illustrated, layer 76 is made of mesh, but may also be any biologically and chemically inert, porous polymer. Mesh layer 76 is underlain by a support net 78, preferably made of plastic. The feeder layer 74 may include materials selected from soil, sand, rich earth, humus, clay, Vermiculite, Perlite, charcoal, activated carbon, wood (burned and unburned), synthetic materials (rockwool), and combinations of the above. The thickness of the receptacle/feeder layer is preferably between about 1 to 10 centimeters, although we have found that a 1 cm feeder layer is sufficient. Metal-containing solution 75 is aerated via an air input conduit 77 and nutrients are supplied externally to the feeder layer via a nutrient conduit 79. In addition, or alternately, external nutrients may be supplied aerially to the terrestrial plant by way of the leaves.

Figure 2:
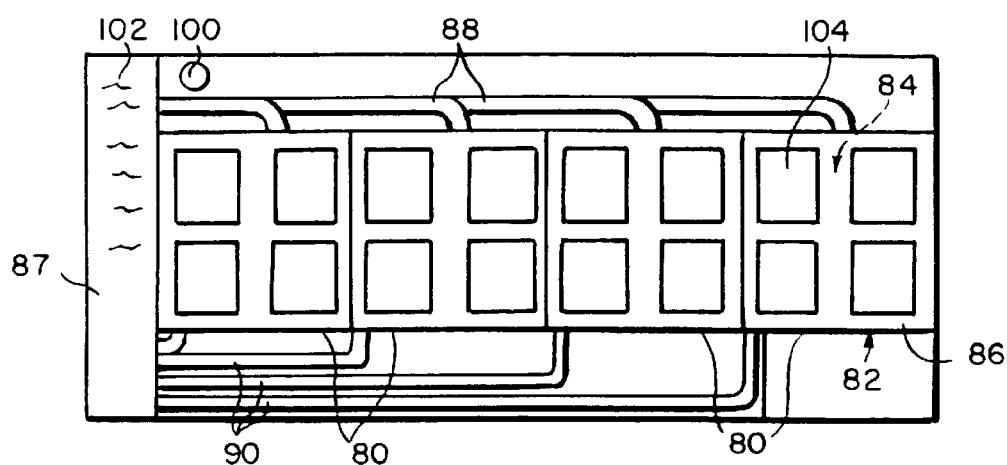
FIG. 2 is a schematic, top-view of another embodiment of the receptacle/feeder layer assembly of the invention.
Figure 2A:
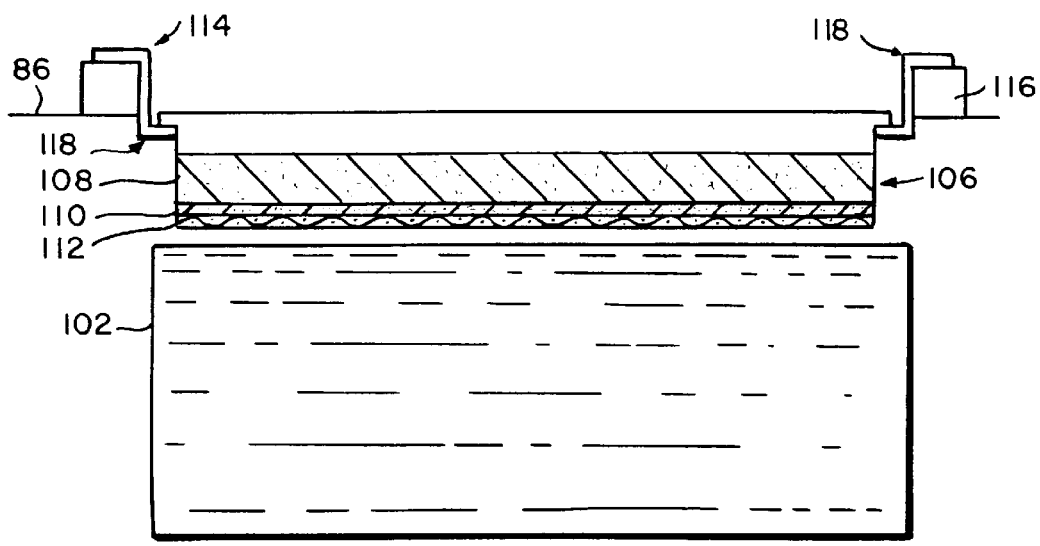
FIG. 2A is a schematic, cross-sectional view through a receptacle and feeder layer of the embodiment of FIG. 2.

One example of an expanded hydroponic system is illustrated in FIG. 2. The system consists of a series of plant growing tanks 80, each tank 80 including a plurality of walls 82 connecting a base end 84 resting on the ground and a plant receiving end 86 located in facing relationship to the base end 84. Individual tanks 80 may be substantially square, although any multi-walled, hollow tank shape will suffice. In FIG. 2, each respective tank 80 is discrete and separated from its nearest neighbor, although other configurations are possible, including design of a single, rectangular tank. A reservoir 87 is in fluid communication with each tank 80 by way of inlet 88 and outlet 90 conduits. A pump 100 recirculates a metal-containing hydroponic solution 102 between the tanks 80 and reservoir 87. A plurality of apertures 104 is defined in the plant receiving end 86 of each tank 80. Referring to FIG. 2A (where reference numbers represent identical features, unless otherwise noted), each aperture is adapted to receive a removable receptacle 106 that contains the feeder layer 108 overlying a porous layer 110 of, for example, polyurethane foam. The porous layer 110, in turn, overlies a support mesh 112. The support mesh 112 is spaced apart from the hydroponic solution 102 by a distance (X) of about 1 cm (0.5 inches). Suspension of the receptable 106 over the solution 102 and engagement of the receptacle 106 in the aperture may be accomplished using any conventional removable fastening means, including various Velcro (r) arrangements, clips, spring-loaded holders, snap-fittings, and the like. In the embodiment illustrated, the fastening means 114 includes a shoulder 116 arranged around an outer periphery 118 of the aperture. The shoulder 116 is adapted to mate with a corresponding detent 118 protruding from the receptable 106. The receptacle 106 is suspended from the shoulder 116 via the detent 118. An exemplary system includes 4 tanks, each a cube about 100 cm (40") on a side (total system volume=4,195 liters ). Each aperture is about 35 cm by 43 cm (about 14" by 17"). In use, the solution is maintained in a constant flow over the roots of the plants. Alternately, the flow can be stopped and the roots allowed to take up and/or precipitate the metal under static (i.e., no flow) conditions. The roots are then separated from the solution.

It will be appreciated that a variety of other hydroponic systems can be employed using the columns of the present invention. For example, a series of columns containing hydroponic beds can be aligned in series or they can be aligned in a parallel. Moreover, the solution can flow continuously through the columns containing the hydroponic treatment beds. Further, the flow can be intermittent so that the solution within a given bed is static. Regardless of the type of flow or column configuration, after a certain time sufficient for the plants to convert the soluble metal to insoluble metal, the solution can be removed and the roots separated therefrom. Other methods, besides pumps, may be used to move the solution through the column(s). Solution can be, for example, gravity-fed to the column(s).

Figure 3:
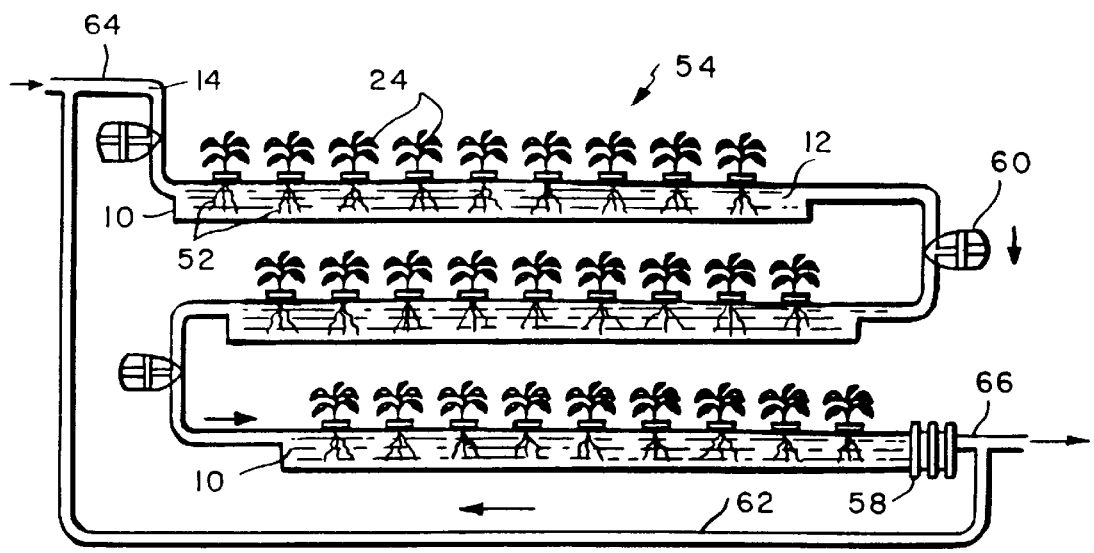
FIG. 3 is a schematic, cross-sectional illustration of a flow-through embodiment of the invention.
Figure 4:
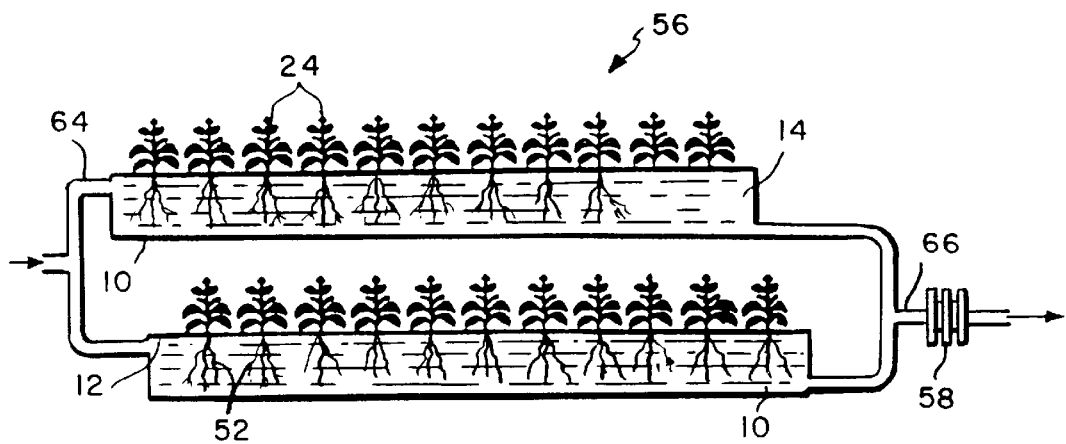
FIG. 4 is a schematic, cross-sectional illustration of an intermittent flow embodiment of the invention.

A schematic illustration of a flow-through system 54 is illustrated in FIG. 3. A plurality of columns 10 are connected in series and the solution 14 is pumped through the column by one or more pumps 60. A conduit 62 is in fluid communication with a solution inlet conduit 64 and with a solution exit conduit 66. Conduit 62 serves as a recirculation loop for solution flow. A schematic illustration of an intermittent flow system 56 is illustrated in FIG. 4. A plurality of columns 10 is arranged in series to a solution inlet conduit 64 and to a common exit conduit 68. The flow can conveniently be stopped to provide static conditions with the columns. After uptake and/or precipitation, flow is again started. Illustrated in FIGS. 3 and 4 is a filtration block 58 placed at a downstream end 44 of the flow-through column and placed at the common exit conduit of the intermittent flow system. Filtration block 58 can contain one or more filters (not shown) for separating the precipitated, insoluble metal from the solution 14. The type of membrane used to separate the precipitated metal can be one of a variety of commercially available filters such as, for example, those manufactured by Millipore Company, Bedford, Mass., and Whatman International Ltd., Maidstone, England.

There are several ways to prepare plants or their roots for removal of metals using the present methods. The simplest method is to grow plants hydroponically within the columns described herein, the columns being filled with nutrient solution. Growth is continued until the roots reach the appropriate size. At this point, the roots are exposed to the solution containing metal. Alternatively, the plants can be grown separately in a "nursery" (either hydroponically or in solid growth medium) and then transferred to the hydroponic treatment beds when the roots reach the appropriate size.

Applicants have discovered that excised roots of sunflowers and some Brassicaceae members are also effective in removing metals from solutions. To perform the methods using excised roots, the roots are simply cut off from hydroponically cultivated plants and immersed in a metal-containing solution. That is, a column such as those illustrated herein can be filled with excised roots and the metal-containing solution allowed to contact the roots, in a manner similar to that described previously (see Example 4).

The invention will now be illustrated by the following Examples.

EXAMPLE 1

Feeder layer—Root Growth using Externally Supplied Nutrients

Several experiments were conducted to separate metal accumulating ability of terrestrial plant roots from any reliance on nutrient supply processes to the roots. As shown in FIG. 1, external nutrients were supplied to a layer of absorbent material (feeder layer) contained within a receptacle supported above the surface of nutrient-free water. The feeder layer was kept moist with a nutrient solution to prevent the plants from becoming nutrient deficient. At the same time, the water content in the feeder layer was minimized to stimulate plant root production into the nutrient-free, hydroponic media. Thus, in these experiments the processes of nutrition and water supply were separated.

We have also established that using the feeder layer method it is possible to grow plants hydroponically so that the main part of the root system will be established in a nutrient-free water stream containing contaminants.

Experiment A: Rockwool was used as the feeder layer. Sunflower seedlings were grown hydroponically. Two receptacles were placed in a column containing 4 L of tap water ("hydroponic fluid"). Nutrient solution was added to the respective feeder layers and the dry weight of roots determined after 5 weeks. The nutrient additions were : (1) 120 mL in the column once a week ("Bottom"); (2) 60 mL in the feeder layer of each receptacle once a week ("Top 1/7"); 60 mL in the feeder layer of each receptacle twice a week ("Top 2/7"); 60 mL in the feeder layer of each receptacle every other day ("Top 1/2"). Healthy plants with a well developed root systems were observed in all treatments. There was no significant difference in root biomass developed in the hydroponic fluid between the various nutrient treatments. See FIG. 9

Experiment B: Vermiculite was used as the feeder layer. Sunflower seedings were grown hydroponically. Four receptacles were placed in a column containing 4 L of tap water or standard nutrient solution. A drip irrigation system was used to keep the feeder layer moist. Plants in the column with tap water were supplied with 60 mL of standard nutrient solution in the feeder layer of each receptacle every other day. (See FIG. 10: "Top"). Plants developing in the nutrient solution enabled the growing roots to directly take up nutrients from the water. These plants were supplied with 60 mL of tap water in the feeder layer of each receptacle in the column (FIG. 10: "Bottom"). After 4 weeks the plants were harvested. Healthy plants with a well developed root systems were observed in both treatments. There were no significant difference between treatments in measurements of root biomass outside the feeder layer. Significantly, plants fed with external nutrients through the feeder layer did have more well developed root systems in the feeder layer than plants fed with nutrients directly by way of the hydroponic fluid.

Experiment C: Seeds of six species of crop plants (Sunflower: *Helianthus annuus* L.; Rye: *Secale cereale* L.; Indian Mustard: *Brassica juncea* (L.) Czern.; Pea: ; Bean: ; and Alfalfa: *Medicago sativa* L.) were planted in 35.5×43 cm receptacles with a plastic mesh bottom. The receptacles were filled with a feeder layer containing about 3 cm of fine Vermiculite, supported by a 5 mm-thick sheet of porous polyurethane foam. Sixteen receptacles with plants were placed on top of a 1 m-deep tank filled with 3000 L of recirculated and aerated, tap water maintained at 21 degrees C. The receptacles were fastened to a light-tight frame covering the top of the tank. About 0.5 L of nutrient solution was added to the feeder layer three times per week. Full strength nutrient solution was prepared by dissolving 1.3 g of Hydrosol™ and 2.6 g $Ca(NO_3)_2$ in one liter of water. For the first two weeks, half strength solution was used followed by full strength solution for the next two weeks following. Double strength solution was used for the rest of the experiment which lasted 10 weeks. Six to 100 plants per receptacle were grown and the length of the longest roots was recorded periodically (FIG. 11).

EXAMPLE 2

Screening of Terrestrial Plants for Accumulation and Precipitation of Metals

Lead Removal

This Example illustrates removal of lead from a solution by the roots of various cool and warm season turfgrasses and other plants selected for the use in the present method. Seed-grown plants or grass sod are cultivated hydroponically with roots growing in nutrient solution complemented with 0.6 g/L $Ca(NO_3)_2$. The nutrient solution is preferably 1 g/L Hydrosol™. This solution consists of the following components:

Step 1: Dissolve 0.97 g of this material in 1 liter to obtain the following concentrations:

| Elemental Composition | Total ppm |
| --- | --- |
| Nitrogen (all Nitrate) | $NO_3$ −50.0 |
| Phosphorus | P 48.0 |
| Potassium | K 210.0 |
| Magnesium | Mg 30.0 |

| Elemental Composition | Total ppm |
| --- | --- |
| Sulfate | $SO_4$ −2117.0 |
| Iron | Fe 3.0 |
| Manganese | Mn 0.50 |
| Zinc | Zn 0.15 |
| Copper | Cu 0.15 |
| Boron | B 0.50 |
| Molybdenum | Mo 0.10 |

Step 2: Add 0.644 g/L of calcium nitrate to the solution. Total nutrient concentration will be:

Nitrogen as N: 150 ppm N

Calcium as Ca: 129 ppm Ca

Hydroponic cultivation is performed in a system similar to that shown in FIG. 2 except that a relatively small amount of root tissue is used. After 2 to 4 weeks, the nutrient solution is substituted with a continuously aerated solution of $Pb(NO_3)_2$ containing 275 mg/L of lead as lead ion. The total volume of the solution is kept at 400 ml by the addition of distilled water to compensate for water lost through plant transpiration and evaporation. Lead accumulated in the plant tissue and lead remaining in the solution is measured after 3 days. The difference between lead decrease in the solution and lead uptake by roots represents the amount of lead precipitated by root exudate. (See Table 1, below.) Filter paper controls (thin strips of filter paper, 0.4 g DW (dry weight), immersed in the aerated lead solution) are used to demonstrate that lead uptake and precipitation is root specific. Similar results were obtained in a larger (7 L total volume) flow-through system. Experiments are done in an environmentally controlled growth chamber at 25° C., 75% relative humidity, and 16 h photoperiod (600 $\mu$mol m$^{-2}$ sec$^{-1}$) provided by a combination of incandescent and cool-white florescent lights.

Heavy metals in root tissue are analyzed using a Fisons Direct Current Plasma Spectrometer (DCP) model SS-7. Roots are dried for 2 d at 80° C. and ashed at 500° C. for 6 h. Ash is dissolved in 2 parts of 1M $HNO_3$: 1 part of 2M HCl and the solution analyzed by DCP. Lead concentrations in solutions are analyzed directly using a Perkin Elmer 603 Atomic Absorption Spectrophotometer. Other metals in solution are analyzed by DCP. The fact that the amount of metal measured at 0 time is often slightly less than the amount of metal dissolved in solution suggests that some metal is absorbed to the walls of the experimental container.

TABLE 1

| Species, 'Cultivar' (Scientific Name) | Season | Cultivation method | Disappearance from the solution (mg Pb/gm DW roots ± SE) | Pb in roots (mg/gm DW root ± SE) |
| --- | --- | --- | --- | --- |
| Colonial bentgrass, 'Exeter' (*Agrostis tenuis* Sibth.) | Cool | Seed | 675 ± 200 | 169 ± 11 |
| Kentucky bluegrass, 'Liberty' (*Poa pratensis* L.) | Cool | Seed | 545 ± 12 | 165 ± 16 |
| Perennial ryegrass, 'Brazil II' (*Lolium perenne* L.) | Cool | Seed | 543 ± 34 | 134 ± 3 |
| Creeping bentgrass, 'Putter' (*Agrostis palustris* Huds.) | Cool | Seed | 485 ± 99 | 146 ± 30 |
| Chewing Fescue, 'Jamestown' (*Festuca rubra* var. *commutata* Gaud.) | Cool | Sod | 388 ± 277 | 27 ± 9 |
| Sheep fescue, 'Bighorn' (*Festuca ovina* L.) | Cool | Seed | 352 ± 59 | 111 ± 11 |
| Weeping lovegrass (*Eragrostis curvula* (Schrad.)) | Cool | Seed | 289 ± 82 | 142 ± 12 |

TABLE 1-continued

| Species, 'Cultivar' (Scientific Name) | Season | Cultivation method | Disappearance from the solution (mg Pb/gm DW roots ± SE) | Pb in roots (mg/gm DW root ± SE) |
|---|---|---|---|---|
| Nees | | | | |
| Hard fescue, 'Reliant' (*Festuca ovina* L. var. *duriscula* (L.) Koch.) | Cool | Sod | 258 ± 37 | 102 ± 9 |
| Tall fescue, 'Rebel' (*Festuca arundinacea* Schreb.) | Cool | Seed | 243 ± 72 | 85 ± 3 |
| Kentucky bluegrass, 'Baron' | Cool | Sod | 238 ± 31 | 69 ± 7 |
| Hard fescue, 'Crystal' | Cool | Seed | 231 ± 10 | 125 ± 7 |
| Creeping red fescue, 'Pennlawn' (*Festuca rubra* L. var. *genuina*) | Cool | Seed | 214 ± 23 | 86 ± 4 |
| Perennial ryegrass 'Cosmos' | Cool | Sod | 157 ± 35 | 80 ± 9 |
| Bermudagrass 'Sahara' (*Cynodon dactylon* (L.) Pers.) | Warm | Seed | 507 ± 117 | 90 ± 7 |
| Buffalograss, 'Texoka' (*Buchloe dactyloides* (Nutt.) Engelm.) | Warm | Seed | 393 ± 133 | 56 ± 4 |
| Centipedegrass (*Eremochloe ophiuroides* (Munro) Hack) | Warm | Seed | 385 ± 82 | 124 ± 13 |
| Switchgrass 'Blackwell' (*Panicum virgatum* L.) | Warm | Seed | 342 ± 109 | 116 ± 5 |
| Japanese lawngrass (JM-107) (*Zovsia japonica* Steud.) | Warm | Seed | 162 ± 25 | 56 ± 2 |
| Coastal panicgrass 'Atlantic' (*Panicum amarum* var. *amoralum* (Hitch & Chase)) | Warm | Seed | 148 ± 27 | 109 ± 9 |
| Wild cabbage (*Brassica oleracea*) | | Seed | 659 ± 205 | 134 ± 15 |
| Spinach (*Spinacia oleracea* L.) | | Seed | 626 ± 309 | 95 ± 25 |
| Sunflower (*Helianthus annuus* L.) | | Seed | 478 ± 87 | 140 ± 5 |
| Sorghum (*Sorghum bicolor* (L.) Moench) | | Seed | 234 ± 88 | 88 ± 7 |
| Tobacco (*Nicotiana tabacum* L.) | | Seed | 214 ± 41 | 132 ± 6 |
| Indian mustard, (*Brassica juncea* (L.) Czern.) | | Seed | 177 ± 38 | 103 ± 7 |
| Corn (*Zea mays* L.) | | Seed | 90 ± 25 | 75 ± 13 |
| Filter paper control | N/A | N/A | 15 ± 4 | 2 ± 0 |

Removal of Heavy Metals Other Than Lead

Lead was not the only metal effectively removed from water by roots. Salt solutions of Cd $(NO_3)_2 \cdot 4H_2O$, Pb $(NO_3)_2$, Cu $(NO_3)_2 \cdot 3H_2O$, Zn $(NO_3)_2 \cdot 6H_2O$, Ni $(NO_3)_2 \cdot 6H_2O$ and $K_2Cr_2O_7$ were prepared in deionized water. and removal of other heavy metals is demonstrated by immersing roots of hydroponically grown *B. juncea* plants in 400 mL of deionized water containing $Cd^{+2}$(2 mg/L), $Ni^{+2}$(10 mg/L), $Cu^{+2}$(6 mg/L), $Zn^{+2}$(100 mg/L), $Cr^{+6}$(4 mg/L), or $Pb^{+2}$(2 mg/L). See FIG. 8.

Figure 8:
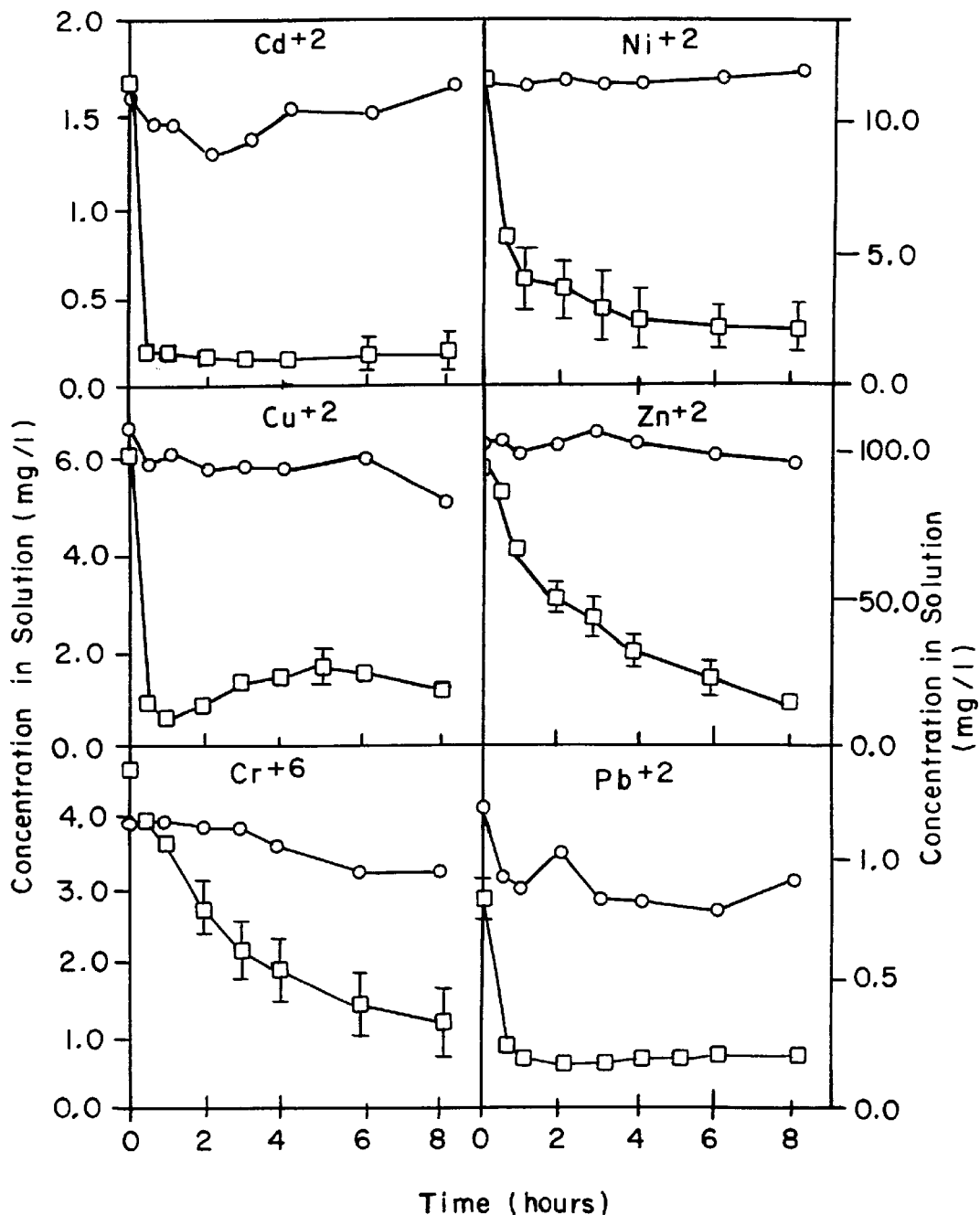
FIG. 8 shows the removal of different metals from aqueous solutions by B. juncea roots (□). Metal ions are indicated on the top of each panel. Metal concentrations in 10 mL aliquots removed from solutions were determined by DCP with a detection limit of 0.15 μg/g. This value was assigned to all measurements below the detection limit. Control treatments (o) did not contain roots. Roots immersed in the solution had DW from 0.7 g to 1.7 g. Vertical bars denote S.E. (n=4).

Experimental plants do not show visible phytotoxicity for the duration of the experiment. In 8 hours, roots dramatically reduce the content of all tested metals in solution. See also FIGS. 12–14. Bioaccumulation coefficients, the ratio of metal concentration in root tissue ($\mu$g/g DW) to initial metal concentration in solution (mg/L), determined after 24 h of metal treatment vary significantly for different metals (Table 2). At the concentrations used, Pb has the greatest bioaccumulation coefficient of 563, while Zn has the lowest, 131. The bioaccumulation coefficients of metals are not proportional to the initial concentration of each metal in the solution. Significantly more Cd, Ni, Cu, Zn and Cr is removed from solution than is recovered in roots (Table 2). This suggests that these metals are not only absorbed by the roots, but are also precipitated from the solution by root exudates or, possibly, transported to the shoots. Roots removed the chromium anion, $CrO4^{-2}$, almost as efficiently as the cations of other metals (FIG. 8 and FIG. 13).

TABLE 2

Heavy Metal Uptake by Roots of *Brassica juncea*

| | Concentration | | Amount | | Recovery | |
|---|---|---|---|---|---|---|
| Metal | Solution (mg/l) | Roots[a] ($\mu$g/g DW ± SE) | Solution ($\mu$g) | Roots ($\mu$g + SE) | in roots (% ± SE) | Bioaccumulation coefficient |
| Zn | 100 | 13147 ± 1815 | 40000 | 18378 ± 2903 | 45.9 ± 7.3 | 131 |
| Cd | 2 | 268 ± 41 | 800 | 440 ± 15 | 55.0 ± 1.8 | 134 |
| Cr | 4 | 716 ± 30 | 1600 | 815 ± 49 | 50.9 ± 3.1 | 179 |
| Ni | 10 | 2080 ± 373 | 4000 | 1795 ± 295 | 44.9 ± 7.4 | 208 |

TABLE 2-continued

Heavy Metal Uptake by Roots of *Brassica juncea*

| Metal | Concentration | | Amount | | Recovery | Bioaccumulation coefficient |
|---|---|---|---|---|---|---|
| | Solution (mg/l) | Roots[a] ($\mu$g/g DW ± SE) | Solution ($\mu$g) | Roots ($\mu$g + SE) | in roots (% ± SE) | |
| Cu | 6 | 2943 ± 261 | 2400 | 2339 ± 147 | 97.5 ± 6.1 | 490 |
| Pb | 2 | 1126 ± 77 | 800 | 806 ± 5 | 100.8 ± 0.6 | 563 |

[a]Roots were exposed to different metal solutions for 24 h (see FIG. 6) ± S.E. (n = 3)

EXAMPLE 3

EMS Mutagenesis

This example illustrates a protocol for use in mutagenizing plant members of the family Brassicaceae.

1. Dry seeds are placed in about 100 ml of a 0.3% (v/v) solution of EMS (obtained from Sigma chemicals, St. Louis, Mo.). There may be some variation from batch to batch of EMS so it may be necessary to adjust this concentration somewhat. Between 20,000 to 250,000 seeds are mutagenized at a time. Ethyl methane sulfonate (EMS) is a volatile mutagen. It should be handled only in a fume hood and all solutions and materials which it contacts should be properly disposed of.
2. Seeds are mixed occasionally or stirred on a stir plate and left at room temperature for 16–20 hours. The rate of mutagenesis may be temperature-dependent so using a magnetic stir plate may alter the results by warming the solution.
3. Seeds are washed with distilled water 10 to 15 times over the course of 2 to 3 hours by decanting the solution, adding fresh water, mixing, allowing the seeds to settle, and decanting again. After about 8 washes the seeds are transferred to a new container and the original is disposed of.
4. After washing, the seeds are immediately sown at about 3 seeds per square cm (3000 seeds in 50 ml of 0.1% agar per 35×28×9 cm flat).
5. After several weeks it is useful to estimate the number of seeds which have germinated in order to know the size of the M1 generation. About 75% of the mutagenized seeds usually germinate. Ideally, the M1 estimate is the number of plants which produce M2 seed, but this is much more difficult to measure.
6. Plants are grown until they begin to die naturally and are then allowed to dry completely before harvesting. Complete drying improves the yield and simplifies harvesting.

EXAMPLE 4

Kinetics of Metal Removal

Figure 6:
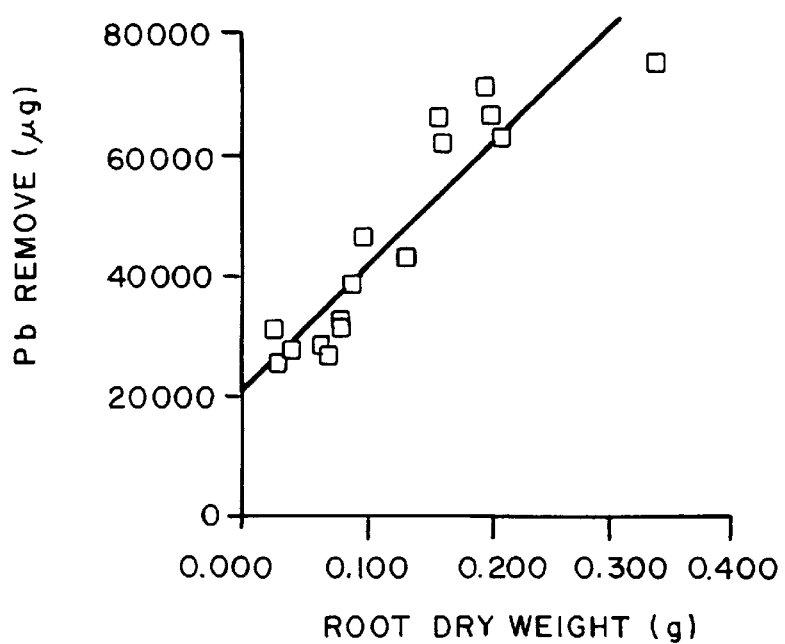
FIG. 6 is a graph illustrating the positive linear correlation between lead removal and sunflower root biomass; y=194325.3x+20845.3 (r=0.91).
Figure 5A:
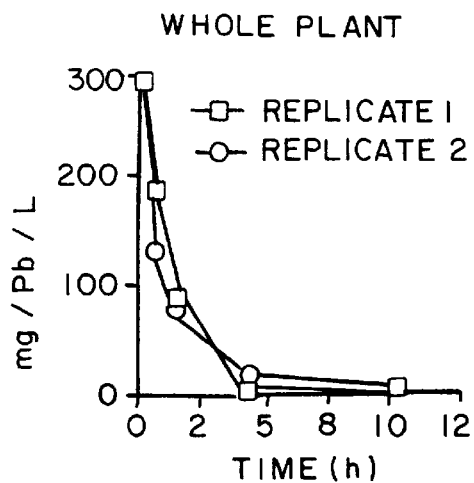
FIG. 5 is a graph illustrating the time course of lead removal by two replicate whole sunflower plants (□, ○) and two replicate excised sunflower roots (■, ●).
Figure 5B:
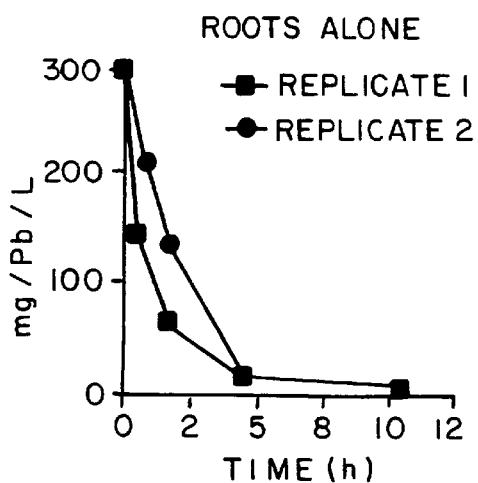

To determine the kinetics of lead removal, the roots of 7-week-old intact sunflower plants are incubated in a feeder layer assembly similar to that shown in FIG. 1 (total volume 400 ml). Within 4.5 hours, roots of the intact sunflower plants remove more than 90% of 275 mg Pb/L initially present in the solution (FIG. 5B). Total fresh root mass of plant 1 is 33.2 g (2.1 g dry weight) and of plant 2 was 30.7 g (2.3 g dry weight). Furthermore, the rate of lead removal is significantly correlated (r=0.83) with the root dry biomass used in the experiment (FIG. 6).

Other metal ions (e.g. $Ca^{+2}$, $Co^{+2}$, $Cu^{+2}$, and $K^+$) do not significantly interfere with the ability of rhizofiltrating plants to accumulate lead ion. This suggests that the present methods can be used to remove lead from complex aqueous mixtures containing different ions.

It is significant that, under the appropriate conditions, terrestrial plants may reduce the amount of heavy metal in solution by up to two orders of magnitude, i.e., from mg/L (parts per million) levels down to ten parts per billion or less. In many cases, the concentration of heavy metal in solution after rhizofiltration is equal to, or less than, the detection limit of the measuring equipment. The following experiments illustrates this point.

Sunflower seedlings were cultivated hydroponically with roots growing in an aerated nutrient solution (1 g/L Hydrosol TM, supplemented with 0.6 g/L calcium nitrate). Each hydroponic unit consisted of a PVC plastic cylinder (12 cm tall, 10 cm in diameter) which contained 2 plants supported by a feeder layer assembly; a metallic grid, positioned 7 cm from the bottom of the container, and a 1 cm deep layer of Vermiculite placed on the top of the grid. Eight hydroponic units were placed in a common tray containing 4 L of nutrient solution. After 5 weeks, plants were selected for uniformity (average root dry weight was 0.7 g ±0.2 g). The roots were rinsed for 20 min in deionized water to remove traces of nutrient solution.

Thereafter, the feeder layer assembly with plants was inserted for 24 hours into a 13 cm deep, clear plastic container with 750 ml of a continuously aerated solution of a metal. Eight heavy metals were tested in the form of solutions of $Pb(NO_3)_2$; $Cd(NO_3)_2$; $Cu(NO_3)_2$; $Ni(NO_3)_2$; $MnCl_2$; $K_2Cr_2O_7$; and $NaAsO_2$. The total volume of the solution was kept constant by adding deionized water to compensate for water lost through plant transpiration, sampling, and evaporation. Experiments were done in an environmentally controlled growth chamber at 25 degrees C., 75% relative humidity, and 16 h photoperiod (600 umol/m$^2$/sec), provided by a combination of incandescent and cool-white fluorescent lights. Control treatments (open circles in FIGS. 12 and 13) did not contain roots.

In all experiments, plant roots caused a dramatic reduction of the metal concentration in solution. For Cd, Pb, Cu and Ni, within the first hour of experiment the concentration dropped by several fold. This rapid phase was followed by a slower phase. See FIG. 12. For the remaining metals, the rapid phase was not as clearly expressed. Nevertheless, in 24 hours, sunflower roots were able to reduce the concentration of Mn and Cr two orders of magnitude (1000 to 10 micrograms/L). See FIG. 13. The relatively slow rate of Zn removal from solution could be explained by phytotoxicity observed in the particular experiment. Arsenic was tested at a low concentration and that could partly account for the slower rate of metal removal.

In order to take advantage of the first rapid phase of metal removal, a Cd containing solution was treated for four hours with roots of sunflower plants. After every hour, the plants and attached roots were replaced with fresh plants. During the experiment (run in duplicate) the concentration of cadmium dropped from 700 ug Cd/L down to below the detection limit of the cadmium assay (about 5 ug g Cd/L). See FIG. 14. It will be appreciated that even a decrease in metal concentration by a factor of two may, in most cases, be sufficient to provide water that meets current governmental standards for metal contamination.

EXAMPLE 5

Metal Accumulation By Excised Roots

Roots are excised from hydroponically cultivated terrestrial plants and the excised roots immersed in a column containing a solution with lead ions (400 ml total volume with $Pb^{+2}$ concentration between 275–285 mg /L). The time course of lead removal by the roots connected to the plant is also compared with uptake by excised roots alone. FIG. 5 also illustrates the comparison of kinetics of lead uptake between the roots of the intact sunflower plants and excised sunflower roots (total fresh root biomass for excised roots was 12.1–15.7 g (0.8–1.0 g dry weight).

Figure 7:
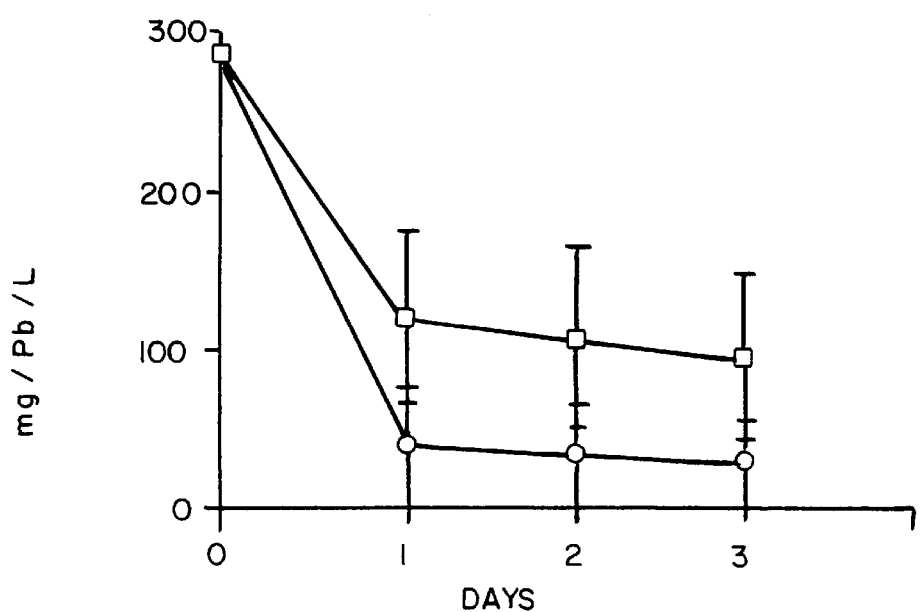
FIG. 7 is a graph illustrating the time course of lead removal by B. juncea excised roots (○) and B. juncea whole plants (□).

FIG. 7 shows kinetics of lead uptake for whole *B. juncea* plants (□) and excised *B. juncea* root (○). The average fresh root mass for the whole plant was 3.3±0.3 g (0.3±0.1 g dry weight; n=4). The average fresh root mass for the excised roots alone was 3.7±1.0 g (0.3±0.1 g dry weight; n=4).

EXAMPLE 6

Chemical Analysis of Precipitate

Lead-treated roots of bermudagrass, *B. juncea* and sunflower are subjected to scanning electron microscopy with a Jeol 35C SEM operating at 15 kV acceleration. Imaging is done in both secondary electron mode and back scattered electron mode to visualize the sites of lead deposition in the root tissue. The initial results suggest that most of the lead ion accumulates in the extracellular spaces of the epidermal layer in the form of a mixture of lead carbonate, some lead phosphate and, possibly, lead oxide. Lead removal in the present method is caused by both metal accumulation in plant roots and by the ability of roots of living plants to precipitate lead ions from the solution. The precipitated lead gives a distinctly milky appearance to the solution surrounding the roots. Chemical analysis of the root precipitate collected from the system is performed by infrared spectroscopy using a Mattson "Cygnus 100" Fourier-transform Infrared Spectrometer at 4 $cm^{-1}$ resolution and direct current plasma spectrometry. The precipitate was identified as lead phosphate $Pb_3(PO_4)_2$. The chemical structure of the precipitate did not vary when different species were used in the system. These results may indicate that phosphate exudation functions as a defense mechanism elicited in grass roots by lead and possibly other metals. The function of this defense mechanism may be to precipitate lead before it has a chance to come in contact with living root tissues.

EXAMPLE 7

Vector Construction and Transformation of *B. jJuncea* with MT Genes

A. Vector Construction

Monkey MT cDNAs (MT1 & MT2) are obtained form Dr. Dean H. Hamer, National Institutes of Health, Bethesda, Md. A 341 bp Hind III/Bam HI fragment containing the entire MT1 coding sequence including the initiator methionine codon is cloned into the Hind III/Bgl II site of pJB90 to give plasmid pNK1. pJB90 (obtained form Dr. Deepak Pental, Tata Energy Research Institute, New Delhi, India) is an Agrobacterium-based binary, plant transformation/ expression, vector. This plasmid contains a plant selectable hpt (hygromycin phosphotransferase) gene and a multiple cloning site for the insertion of foreign DNA, between the T-DNA border repeats. The plasmid also contains a gene for spectinomycin resistance, functional in bacterial cells. pNK1 propagated in *E. coli* Dh5 was used to transform *Agrobacterium tumefaciens* strain pGV2260 (Deblaere et al., Nucl. Acids. Res., 13: 4777, 1985) by the freeze-thaw method (Ebert et al., *PNAS, U.S.A.,* 84: 5745, 1987).

B. Transformation of *B. Juncea*

*Agrobacterium tumefaciens* strain pGV2260 carrying pNK1 is grown overnight ((220 rpm, 28° C. in dark) in 5 mL of liquid YEB [beef extract-0.5%; yeast extract-0.1%; peptone-0.5%; sucrose-0.5%; $MgSO_4.7H_2O$-0.005%] containing 100 mg/L each of spectinomycin and rifampicin. One mL of this suspension is used to inoculate 50 mL of the YEB with the same concentrations of antibiotics and allowed to grow overnight. On the third day, the bacteria are harvested by centrifugation (5500 rpm) and resuspended in filter sterilized liquid MS (see Murashige, T., and Skoog, F., *Physiol. Plant.* 15: 473–497, 1962) modified medium (MS salts & vitamins with 10 g/L each of sucrose, glucose and mannitol) supplemented with 200 micromolar acetosyringone and 100 mg/L each of spectinomycin and rifampicin at pH 5.6. The optical density of the bacterial suspension is adjusted to about $A_{600}$=1.0 and the bacteria grown for 6 hours, harvested as before are resuspended in the same medium. Freshly cut hypocotyl explants are incubated in the bacterial suspension for 1 h and co-cultivated on MS modified medium supplemented with 2 mg/L BAP (6-benzylaminopurine) and 0.1 mg/L NAA (naphthaleneacetic acid). After 2 days the explants are transferred to MS medium supplemented with 2 mg/L BAP, 0.1 mg/L 2,4-D (2-4 dichlorophenoxyacetic acid), 200 mg/L Cefotaxime and 30 micromolar $Ag(NO_3)_2$ and 10 mg/L Hygromycin B. After 10 days incubation on this medium, the explants are shifted to MS supplemented with 2 mg/L BAP, 0.1 mg/L NAA, 200 mg/L Cefotaxime, 10 mg/L Hygromycin B and 10% coconut milk. Shoots developed in 15–20 days are grown further and rooted in the presence of 20 mg/L hygromycin. We have obtained transformants with the line 173874 at a frequency of about 2%.

C. Characterization of MT Gene Expression in Transgenic Plant Lines

About 15 independent transgenic plants are generated for the *B. juncea* line mentioned above. The putative transformants are analyzed for the presence of MT1 DNA by Southern and Northern hybridization analysis using MT1 cDNA as a probe. The putative transformants are analyzed for expression of MT1 protein by immunoblot analysis with antisera against monkey MT.

Transgenic lines expressing high MT levels are selected and tested for lead and chromium accumulation and metal tolerance in greenhouse trials described above. The transgenic lines are evaluated in large scale greenhouse trials which will utilize lead and chromium contaminated soil collected from the polluted sites.

CONCLUSIONS

Roots of the best plants identified in our screens contain about 15% by weight of lead in dry biomass (Table 1), which is the equivalent of 65% lead by weight in ash. This concentration makes reclaiming metals from ash a viable alternative to ash burial. By combining uptake and precipitation, the roots of the most efficient plants (i.e. sunflower) remove amounts of lead equal to 60% of their total dry weight. This is far beyond the capacity of all known ion exchange columns, which may be considered as an alternative to the present methods. In addition, our estimates suggest that the methods of the invention are an order of magnitude cheaper than ion exchange-based purification schemes.

EQUIVALENTS

Those skilled in the art will recognize, or will be able to ascertain using no more than routine experimentation, numerous equivalents to the specific products and processes described herein. Such equivalents are considered to be within the scope of the invention and are intended to be covered by the following claims.

We claim:

1. A method for reducing an amount of metal in a metal-containing solution in which at least one growth promoting plant nutrient is present at a concentration below that needed to support plant growth, the method comprising steps of:

providing a metal containing solution in which at least one growth promoting plant nutrient is present at a concentration below that needed to support plant growth;

contacting the solution with a root biomass of a terrestrial plant; and allowing growth of the root biomass into the nutrient-lacking metal-containing solution under conditions sufficient for the root biomass to remove metal from the solution.

2. The method of claim 1, wherein the step of contacting comprises growing the terrestrial plant in a receptacle and allowing the root biomass of the terrestrial plant to penetrate through the receptacle into the nutrient-lacking metal-containing solution.

3. The method of claim 2, wherein the step of growing comprises incorporating plant nutrients into the receptacle from a plant nutrient source that is external to the nutrient-lacking metal-containing solution.

4. The method of claim 3, wherein the receptacle comprises a feeder layer for receiving externally supplied plant nutrients.

5. A method for reducing an amount of metal in a metal-containing solution, providing a metal-containing solution in which at least one growth promoting plant nutrient is present at a concentration below that needed to support plant growth which solution is in contact with air so that there is an air/solution interface; the method comprising steps of:

contacting a terrestrial plant or terrestrial plant seed with a receptacle;

adding plant nutrients to the receptacle at a concentration and for a time sufficient to allow growth of plant root biomass through the receptacle and into the nutrient-free, solution; and allowing the root biomass under conditions sufficient for the root biomass of the terrestrial plant to remove the metal from the solution.

6. The method of claims 1 or 5, wherein the metal is selected from the group consisting of lead, chromium, iron, magnesium, aluminum, mercury, cadmium, cobalt, nickel, molybdenum, copper, arsenic, selenium, zinc, antimony, beryllium, gold, barium, manganese, silver, thallium, tin, scandium, osmium, lanthanum, thorium, tungsten, rhenium, bismuth, germanium, radium, rubidium, strontium, vanadium, yttrium, technecium, ruthenium, palladium, indium, cesium, and cerium and radionuclides thereof.

7. The method of either one of claims 1 and 5, wherein the terrestrial plant is selected from the group consisting of sunflower, pea, rye, bean, turfgrasses, members of the Family Brassicaceae, spinach sorghum tobacco and corn.

8. The method of claim 7, wherein the turfgrasses are selected from the group consisting of Colonial bentgrass, Kentucky bluegrass, perennial ryegrass, creeping bentgrass, fescues, lovegrass, Bermudagrass, Buffalograss, centipedegrass, switch grass, lawngrass and coastal panicgrass.

9. The method of claim 7, wherein the members of the Brassicaceae are selected from the group consisting of *Brassica juncea* and *B. oleracea.*

10. The method of claim 3 or 5, wherein the step of growing comprises incorporating plant nutrients into the receptacle as an aqueous mist or aerosol into the receptacle.

11. The method of claim 1 or 5, wherein the terrestrial plant is characterized by an ability to deplete, by at least a factor of two, an initial amount of metal from the metal-containing solution.

12. The method of claim 11, further comprising steps of:

replacing the root biomass of the terrestrial plant with root biomass of a second terrestrial plant having a second root biomass;

contacting the metal-containing solution, with root biomass of the second terrestrial plant; and allowing growth of the root biomass of the second terrestrial plant into the nutrient-lacking, metal-containing solution so that the root biomass removes the metal.

13. The method of claim 11, wherein the step of contacting with a terrestrial plant comprises contacting with a terrestrial plant that is capable of depleting at least 50% of the initial amount of metal within a time period of no greater than about 8 hours.

14. The method of claim 11, wherein the metal is selected from the group consisting of cadmium, lead, copper and nickel.

15. The method of claim 11, wherein the step of contacting comprises; engaging the terrestrial plant with a receptacle; and positioning the receptacle above the solution;

adding plant nutrients to the receptacle at a concentration and for a time sufficient to allow growth of root biomass through the receptacle and into the nutrient-lacking metal-containing solution.

16. The method of claim 11, further comprising processing at least the root biomass of the terrestrial plant for its metal content after separating the root biomass from the solution.

17. The method of claim 4, wherein the feeder layer is selected from the group consisting of soil, humus, sand, clay, charcoal, activated carbon, wood, synthetic materials, and combinations thereof.

18. The method of claim 1, further comprising separating the terrestrial plant from the solution.

19. The method of claim 2, wherein the receptacle is disposed at the air/solution interface of the metal-containing solution.

20. The method of claim 2, wherein the receptacle is disposed above the air/solution interface of the metal-containing solution.

21. The method of claim 5, further comprising separating the terrestrial plant from the solution.

22. The method of claim 5, wherein the receptacle is disposed at the air/solution interface.

23. The method of claim 5, wherein the receptacle is disposed above the air/solution interface.

24. The method of either one of claims 1 and 5, wherein the metal comprises mixtures of metals, or mixtures of metals and common organic pollutants.

25. The method of either one of claim 1 and 5, wherein the terrestrial plant is characterized by an ability to remove more than one metal.

26. The method of claim 12, further comprising a step of separating the terrestrial plant from the nutrient-lacking solution.

27. The method of either one of claim 1 and 5 wherein the metal is selected from the group consisting of Zn, Cd, Cr, Ni, Ci, Pb, As, and Mn.

28. The method of claim 18, further comprising a step of processing the terrestrial plant for its metal content after separating the terrestrial plant from the solution.

* * * * *